(12) United States Patent
Banginwar

(10) Patent No.: US 6,859,827 B2
(45) Date of Patent: Feb. 22, 2005

(54) AUTOMATIC DEVICE ASSIGNMENT THROUGH PROGRAMMABLE DEVICE DISCOVERY FOR POLICY BASED NETWORK MANAGEMENT

(75) Inventor: Rajesh P. Banginwar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 10/443,040

(22) Filed: May 22, 2003

(65) Prior Publication Data

US 2003/0195957 A1 Oct. 16, 2003

Related U.S. Application Data

(63) Continuation of application No. 09/587,291, filed on Jun. 5, 2000, now Pat. No. 6,611,863.

(51) Int. Cl.[7] .......................................... G06F 15/173
(52) U.S. Cl. ..................... 709/223; 709/220; 709/203
(58) Field of Search ................................ 709/220, 223, 709/203

(56) References Cited

U.S. PATENT DOCUMENTS

| | | | |
|---|---|---|---|
| 5,768,119 A | 6/1998 | Havekost et al. | 709/224 |
| 5,980,078 A | 11/1999 | Krivoshein et al. | 709/221 |
| 6,052,725 A | 4/2000 | McCann et al. | 709/223 |
| 6,154,787 A | 11/2000 | Urevig et al. | 710/8 |
| 6,286,038 B1 | 9/2001 | Reichmeyer et al. | 709/220 |

*Primary Examiner*—David Y. Eng
(74) *Attorney, Agent, or Firm*—Edward Brake

(57) ABSTRACT

A technique for automatically identifying and assigning devices to device proxies in a policy based network management system is described. Each device proxy registers a filter with the device discovery. The filter may identify one or more characteristics of devices and may also include a communications protocol to be used by the device discovery to communicate with devices. The device discovery, preferably using the specified protocol, obtains device specific information and then identifies devices in the network that match the filters. The device discovery notifies each device proxy of which devices match the proxy's filter. Each device proxy updates its list of devices that it can policy manage based on the notification from the device discovery. Control policies are distributed from a policy server to each of the device proxies. Each device proxy then sends a policy to one or more devices to be policy managed.

11 Claims, 2 Drawing Sheets

AUTOMATIC DEVICE ASSIGNMENT THROUGH PROGRAMMABLE DEVICE DISCOVERY FOR POLICY BASED NETWORK MANAGEMENT

CROSS REFERENCE TO RELATED APPLICATION

This is a continuation of U.S. application Ser. No. 09/587,291, filed Jun. 5, 2000 now U.S. Pat. No. 6,611,863, the subject matter of which is incorporated by reference herein.

FIELD

The invention generally relates to policy based network management and more particularly to an automatic device assignment through a programmable device discovery for policy based network management.

BACKGROUND

Networks and distributed processing systems are of critical importance in business, government and other organizations. The growing trend is towards larger and more complex networks, which support more applications and more users. As these networks grow in size and complexity, the management and control of these networks becomes more difficult.

Current techniques for network management allow for the automatic identification of nodes in a network, the retrieval of information or statistics from each node, and setting or initializing one or more parameters at a node. More recently, policy based network management systems provide a more sophisticated control technique that allows for control policies to be distributed and used for controlling the operation of various network nodes or devices. The COPS (Common Open Policy Service) Protocol, RFC2748, January, 2000 even describes a common protocol to be used to exchange policy information between a policy server and its clients (e.g., devices).

Unfortunately, for policy based network management, the identification and assignment of devices to different device proxies (to receive different control policies) has been largely a manual process, which is unmanageable for larger networks.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention is limited only by the terms of the appended claims.

The following represents brief descriptions of the drawings, wherein.

DETAILED DESCRIPTION

A technique for automatically assigning devices to device proxies in a policy based network management system is described. Each device proxy registers a filter (or set of filters) with a device discovery. The filter may identify the characteristics of devices it can (or would like to) policy manage. The device discovery then obtains device specific information from devices to identify devices in the network that match the filters. The device discovery may obtain the device specific information using a communications protocol specified by the filter. The device discovery notifies each device proxy of which devices match the proxy's filter. Each device proxy updates its list of devices that it can policy manage based on the notification from the device discovery. Control policies are distributed from a policy server to each of the device proxies. Each device proxy then sends to the devices specified within the policy (e.g., this may include the devices which matched the filter for the proxy, or some other devices).

Figure 1:
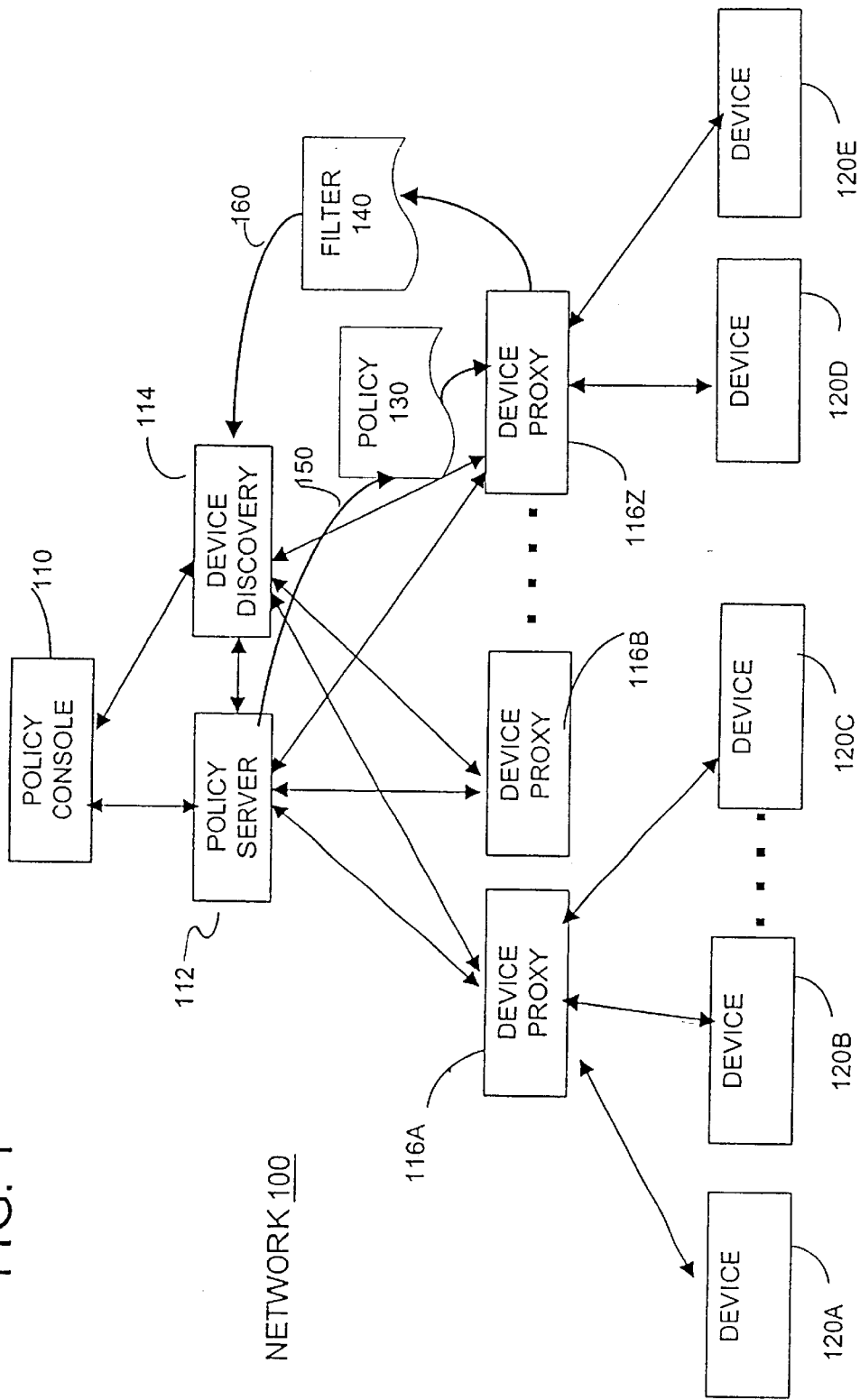
FIG. 1 is a block diagram of a network according to an example embodiment.

Referring to the Figures in which like numerals indicate like elements, FIG. 1 is a block diagram illustrating a network 100 according to an example embodiment. A policy console 110 is provided for creating policies. Typically, these policies may be created by an administrator, but could be automatically created as well. These policies can include a wide variety of control policies (or business policies) for controlling the operation of a wide variety of devices (e.g., switches, routers, network interface controllers or NICs, and other network devices). According to an example control policy, all packets (or traffic) received from a specific range of source Internet Protocol (IP) addresses will be blocked (will not be forwarded) when received between the hours of 9am to 5pm. This is just a very simple policy, but much more elaborate or complicated control policies are commonly used to control the operation of network devices. Other types of example control policies include, firewall or security policies, Virtual Private Network (VPN) policies, priority policies (e.g., where certain traffic is given priority over other traffic), quality of service (QoS) policies, Internet Protocol (IP) security policies, etc.

A policy server 112 receives policies from the policy console 110. Policy server 112 then selectively distributes (or deploys) various policies to one or more device proxies 116. Device proxies 116A, 116B, . . . and 116Z are shown in FIG. 1. However, there may be any number of device proxies 116. Each proxy 116 may be a software program running on a computer or server, and generally operates as an interface between the policy server 112 and one or more devices 120 to be controlled using various control policies. Thus, each device proxy 116 can policy manage one or more devices. Devices 116 can be, for example, a router, a switch, a NIC, or other type of network device.

Policy server 112 may send or distribute policies to various device proxies 116 using a common protocol. According to an example embodiment, policy server 112 distributes policies to proxies 116 using the COPS (Common Open Policy Service) protocol, which uses the Transport Control Protocol (TCP) as a reliable transport to exchange messages between the policy server 112 and the device proxies 116. Other protocols or techniques can be used as well for distributing the policies to proxies 116.

Each device proxy 116 can policy manage one or more devices 120 (e.g., each device proxy 116 may control or manage the devices by distributing specific policies to the controlled devices 120). For example, device proxy 116A policy manages or controls devices 120A, 120B and 120C, while device proxy 116Z policy manages or controls devices 120D and 120E. Although not specifically shown in FIG. 1, proxy 116B also may policy control or manage one or more devices 120 as well.

A device proxy 116 (or other interface program) can be used (or may be necessary) for one of several reasons. For example, policy server 112 may distribute policies using a common protocol (such as COPS) or another protocol which may not be understood by the devices 120 (e.g., the protocol used by policy server 112 may be incompatible with one or more devices 120). For example, the devices 120 may include a wide range of device types from different manufacturers, which may use different device-specific communication protocols (such as Simple Network Management Protocol or SNMP, Telnet, etc.), which may be incompatible from the protocol used by the policy server 112 (e.g., COPs). Thus, in many cases, policy server 112 may not be able to directly communicate to the various types of devices 120 in the network 100. Also, certain devices 120 may be able to receive policies only in a specific format or configuration, which may be different from the policy configuration output by the policy server 112. Thus, in many cases, there will be a need for a device proxy 116 to operate as an interface between the policy server 112 and the different types of devices in the network 100.

As an example, devices 120A, 120B and 120C could be, for example, Cisco routers, while devices 120D and 120E could be, for example, Intel NICs.

Therefore, according to an example embodiment, device proxies 116 can receive a policy from the policy server 112, convert the policy to a device-specific configuration (i.e., a configuration that is native to the device) and then distribute the policy to one or more devices 120 within network 100 using native or device-specific communication protocols. Each proxy may perform these functions for one or more received policies and for one or more groups of policy managed devices.

In the above described Cisco/Intel example, device proxy 116A would receive a first policy from the policy server 112 using a common protocol, such as COPS (or other protocol), convert the first proxy to a first device-specific configuration (e.g., a configuration that is native to these Cisco routers), and then distribute the policy to the Cisco routers (120A–120C) using a device-specific communications protocol, such as SNMP in this example. Likewise, the device proxy 116Z will receive a second policy from the policy server 112 using COPs (or other protocol), convert the second policy to a second device-specific configuration (e.g., a configuration that is native to the Intel NICs) and then send (or distribute) the second policy to the Intel NICs(120D–120E) using a device-specific communications protocol that is specific or native to the Intel NICs (such as Distributed Component Object Model or DCOM in this example).

Thus, it can be seen that the policy server 112 can manage multiple device proxies 116, with each device proxy 116 policy managing multiple devices (e.g., proxy 116A policy manages all Cisco routers 120A–120C, while proxy 116Z policy manages all Intel NICs 120D–120E in the network 100). This example description above is merely provided to explain some features according to an example embodiment, and the invention is not limited thereto.

As noted above, each device proxy 116 may be designed to manage devices of a specific type, such as devices from a specific manufacturer (e.g., Intel or Cisco), devices having a specific model or ID, devices having specific capabilities or attributes (within an IP address range, etc.). Some devices may only be able to receive a policy or communicate with a proxy using a particular device-specific communications protocol. Also, some policies may be specifically designed for specific types of devices. In fact, some devices may not even be able to receive a policy and be policy managed. As a result, it can be important to properly match devices (and device types) to specific types of policies and to specific proxies.

Determining the device-specific information for each device and then assigning each device to a particular device proxy can be a complicated and time consuming process. Presently, the assignment of devices to device proxies is primarily a manual process. The process typically requires an administrator to keep track of each device that is added and removed from the network, the device's attributes and then manually assign each device to a specific device proxy, which is a burdensome process for larger networks.

According to an example embodiment, a technique is provided for automatically assigning devices to device proxies through a programmable device discovery for policy based network management. A device discovery 114 (FIG. 1) is provided to facilitate the dynamic and automatic assignment of devices to device proxies within network 100.

According to an example embodiment, device discovery 114 can receive one or more filters from one or more device proxies 116. The filters provide device-specific attributes or characteristics that identify devices to be policy managed by that device proxy 116. There can be many types of filters. Example filters include:

A device-specific communications protocol (e.g., DCOM, SNMP, Telnet) to communicate with the device (e.g., to obtain device specific information or distribute policies to the device, etc.). Some devices may be able to communicate using only certain or specific communications protocols Manufacturer: Devices from a specific manufacturer (e.g., Cisco, Intel)

Type or Model: All devices of a specific type or model, etc.

All devices having a specific capability (e.g., ability to receive and be managed by specific types of policies such as security policies, VPN policies, etc.)

An IP Address Range (or even a specific IP address): This filter is satisfied when device discovery 114 finds a devices with an IP address which is within the specified range.

Wild filter: all the devices found by the discovery satisfy this filter.

SNMP filter: This is a name-value pair specifying an object identifier and the value in SNMP.

DCOM filter: Specifies the DCOM class GUID (globally unique identifier)

Boolean combinations of above filters/conditions

These are just some example filters. A wide variety of filters can be used, including combinations or Boolean combinations of various filters or conditions. An example filter may specify the device specific information that should be obtained (to indicate a match with the filter) as well as the communications protocol that should be used by device discovery 114 to obtain this information. As a result, device discovery 114 is fully programmable by each proxy 116. For example, device proxy 116A may policy manage all Cisco routers of a specific IP address range, while device proxy 116Z may policy manage all Intel NICs in the network within a specific IP address range. Each proxy 116 may send a corresponding filter (e.g., Cisco routers within address range A for proxy 116A, Intel NICs within address range B for proxy 116Z) indicating the types of devices that the device discovery 114 should identify and return. The filters may also specify the communications protocol that should be used (e.g., SNMP, DCOM) to obtain the device specific information from the devices.

According to an example embodiment, the device discovery 114 automatically discovers the IP addresses for the devices in the network 100. This can be done by using, for example, Internet Control Message Protocol (ICMP) or other well known technique. Under ICMP, the device discovery 114 can "Ping" each of the devices 120 in the network 100 by sending out ICMP messages and awaiting replies.

After obtaining an IP address for each device in the network 100, the device discovery 114 obtains device specific information (e.g., device characteristics or attributes) from each device 120 using a device specific (or native) communications protocol. Each proxy 116 will register one or more filters with the device discovery 114. The registered filters will specify to device discovery 114 the device-specific information to be obtained from the devices (or which match the filter) as well as the communications protocol that should be used by device discovery 114 to obtain this information for each filter.

Device discovery 114 can then match the device-specific information for each device 120 to the filters. According to one embodiment, a match indicates a device that a proxy 116 can policy manage the device. According to another embodiment, each policy provided to a proxy includes an enforcement list—which is a list of devices to be policy managed using the policy. According to yet another embodiment, the proxy 116 can determine which devices to policy manage (e.g., independent of the matching devices). The device discovery 114 then sends messages to the device proxies 116 identifying devices 120 that match their filters (e.g., in one embodiment, this list identifies devices that each proxy 116 can policy manage).

Figure 2:
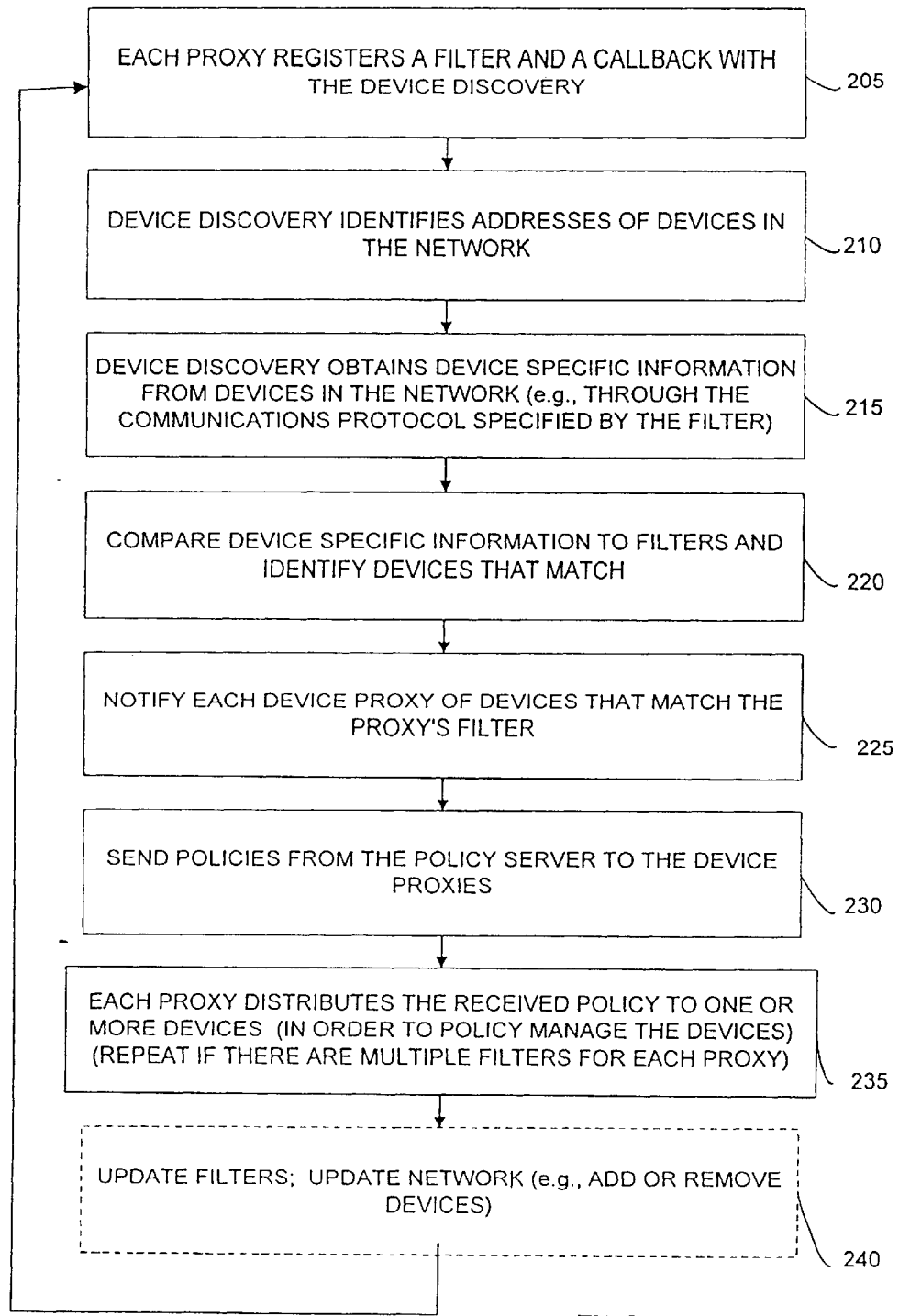
FIG. 2 is a flow chart illustrating an example operation according to an example embodiment.

FIG. 2 is a flow chart illustrating an example operation according to an example embodiment. All blocks of FIG. 2 are not necessarily required.

At block 205, each device proxy 116 registers a filter 140 (FIG. 1) with the device discovery 114 (e.g., sends a filter to the device discovery 114 for matching to devices). The registering of a filter 140 from a device proxy 116Z to device discovery 114 is shown for example in FIG. 1 by line 160. Each device proxy 116 also registers a callback function with the device discovery 114 to create an obligation on the device discovery 114 to identify devices that match the filter and then to notify the device proxy 116 of the matching devices.

At block 210, device discovery 114 uses ICMP or other protocol to identify the IP addresses of one or more of the devices in the network 100. This may involve detecting only newly added or removed devices, or may involve detecting the address of all devices in the network, etc.

At block 215, device discovery 114 obtains device specific information (e.g., device characteristics or attributes such as device model, device manufacturer, device GUIDs, DCOM class-GUID for the device, IP address of the device, an SNMP name-value pair, medium access control or MAC address for the device and so on) through a device-specific communications protocol specified by the registered filter. If only the specified device-specific communications protocol (the protocol specified by the registered filter) is used by device discovery 114, this operates to select or identify devices that can communicate using that protocol. This is because devices without the ability to communicate using that protocol will not communicate with device discovery 114 (e.g., the incompatible devices will not detect or respond to the protocol specific messages). Blocks 210 and 215 are typically not performed through proxies 116, but the communication or these blocks occurs directly between device discovery 114 and the devices 120.

At block 215, device discovery 114 may generally obtain device specific information for one or more devices, or may retrieve only device specific information that is related to (or which matches) the one or more filters registered with the device discovery 114. The second option (selective retrieval of information) is preferable as it is less burdensome and still allows the device discovery 114 to determine if a match exists between a filter and a device.

At block 220, the device discovery 114 compares the device specific information of the devices 120 in the network 100 to each of the filters and identifies those devices that match the filters. Device discovery may also recognize a device 120 matching a filter that has been removed from the network 100.

At block 225, pursuant to the registration of the callback (block 205), the device discovery 114 sends one or more messages to notify each device proxy 116 of devices 120 in the network 100 that match the proxy's filter, and provides at least the IP address of each of the matching devices 120. These messages can typically be used to identify matching devices that have been added to the network 100, or to identify to the proxy previously managed devices 120 (matching the filter) that have been removed or which have failed. Each proxy 116 maintains a list of devices which it can policy manage using a specific type (or types) of policy. Each proxy 116 will update its list of devices 120 it can policy manage based on the messages from the device discovery 114 that identify updated or new devices which match the proxy's filter, or which identify devices which can no longer be managed by the proxy 116 (e.g., have been removed or have failed). The new devices are added to the list while devices that can no longer be policy managed are removed.

The list of the matching devices maintained by the proxy 116 identifies the possible devices 120 in the network 100 that can be policy managed by the proxy 116. According to an embodiment, the proxy 116 makes the final decision as to which matching devices to policy manage. For instance, proxy 116Z may have 100 Intel NICs on its list (all of which matched its Intel NIC filter). However, due to limited resources or the required overhead, for example, the proxy 116Z (or an administrator at the policy console 110) may decide to policy manage only 10 of the 100 Intel NICs that match the filter. This is just an example.

If a proxy 116 includes multiple registered filters, the device discovery 114 provides the IP addresses to the proxy 116 for matching devices 120 for each such filter, and the proxy 116 updates each corresponding list of devices that can be policy managed. According to an example embodiment, a proxy 116 may policy manage one set of devices 120 (matching a first filter) using a first policy and may policy manage a second set of devices 120 (matching a second filter) using a second policy.

According to an embodiment, the device discovery 114 sends a message to the policy console 110 and/or the policy server 112 identifying the devices that match each filter. An administrator at policy console 110 or policy server 112 may then add an enforcement list of devices to the policy which identifies the devices to be policy managed using the policy. The enforcement list of devices to be policy managed (added to the policy) is typically based upon the devices that match a corresponding registered filter. For example, the enforcement list of devices to be policy managed using the policy may be the same as the devices that match the corresponding registered filter, or the enforcement list could be a subset of the matching devices, etc.

At block 230, policies received by the policy server 112 from the policy console 110 are distributed or sent to the appropriate device proxies 116. This can occur at any time. For example, a policy 130 is shown in FIG. 1 as being distributed to the device proxy 116Z at line 150. As noted above, each of the policies can include an enforcement list of devices to be policy managed using the policy.

At block 235, Each proxy 116 then sends or distributes a policy to one or more devices 120. According to one embodiment, each proxy 116 sends the policy to the devices to be managed identified by the enforcement list from the policy server 112. According to another embodiment, each proxy 116 uses a policy (or distributes the policy) to policy manage one or more devices that match the registered filter (e.g., the proxy 116 policy manages one or more of the devices 120 from the proxy's updated list that identifies which devices the proxy 116 can policy manage). According to yet another embodiment, the proxy 116 policy manages one or more devices 120 regardless of which devices matched the registered filter. This allows the proxy 116 to policy manage the automatically assigned (or automatically identified) devices 120. Thus, according to an example embodiment, this allows the proxy 116 to policy manage one or more of those devices 120 that were automatically assigned (or identified) by the device discovery 114 to the proxy 116 based on the device matching the proxy's filter. This is a much more efficient and configurable (or adaptable) technique than manually assigning devices to proxies. This is repeated for each policy (e.g., distribute the first policy to the first group of devices, and distribute the second policy to the second set of device).

At block 240, at various points during the operation of the network 100, the network 100 may be updated or changed to add or remove devices 120, reconfigure devices, assign new IP addresses to a device 120, etc. Likewise, each proxy 16 can update its filter(s) or add or remove filters. For example, a device proxy 116 may be policy managing a first group of devices 120 (matching a first filter) using a first type of policy. However, a network administrator using a local console at the proxy 116 (for example) may re-assign the device proxy 116 to instead policy manage a second group of devices 120 (which match a new or second filter) using a second type of policy. Thus, to effect this update, the second filter 140 is sent from the proxy 116 to the device discovery 114, and the first filter is canceled. The policy server 112 sends the second type of policy to the proxy 116. The device discovery 114 then matches devices in the network 100 to the second filter and notifies the proxy 116 (and the policy console 110) of the matching devices 120, including their IP addresses. This new (or second) policy can then be distributed to this second group of devices.

In this manner, an embodiment of the present invention allows for the automatic discovery of devices and the dynamic or programmable matching of devices to specific proxy filters in order to automatically assign devices to device proxies. Policy server 112, device discovery 114 and device proxies 116 can be implemented as software programs or modules running on different computers or servers or a common computer.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method comprising:
   registering a filter, the filter providing one or more attributes or characteristics that identify one or more devices to be policy managed;
   identifying one or more devices in a network which match the filter;
   notifying a device proxy of which devices match the filter;
   the device proxy distributing a policy to one or more of the devices that match the filter in order to policy manage these devices;
   updating and/or changing one or more of the filter, the policy and the device proxy.

2. The method of claim 1 wherein updating and/or changing comprises updating and/or changing the filter.

3. The method of claim 1 wherein updating and/or changing comprises updating and/or changing the filter based on changes to the network.

4. The method of claim 1 updating and/or changing comprises re-assigning the device proxy to policy manage a different device.

5. The method of claim 1 wherein updating and/or changing comprises assigning the device proxy to policy manage an additional device using the same or different policy.

6. The method of claim 1 wherein updating and/or changing comprises:
   the device proxy registering a second filter;
   identifying a second device in the network which match the second filter;
   notifying the device proxy of which device(s) match the second filter; and
   the device proxy distributing a second policy to the second device in order to policy manage this device.

7. The method of claim 1 wherein updating and/or changing comprises:
   the device proxy registering an updated filter;
   identifying devices in the network which match the updated filter;
   notifying the device proxy of which devices match the updated filter;
   the device proxy distributing a policy to the devices which match the updated filter in order to policy manage these devices.

8. A method comprising:
   registering a filter, the filter providing one or more attributes or characteristics that identify one or more devices to be policy managed;
   identifying one or more devices in a network which match the filter;
   notifying a proxy of which devices match the filter;
   the proxy distributing a policy to one or more of the devices that match the filter in order to policy manage these devices;
   changing one or more aspects of the network;
   updating and/or changing the filter and/or the policy based upon the changes to the network.

9. The method of claim 8 wherein the changing one or more aspects of the network comprises adding or removing one or more devices from the network.

10. The method of claim 8 wherein the changing one or more aspects of the network comprises reconfiguring one or more devices in the network.

11. The method of claim 8 wherein the updating and/or changing comprises:
    updating the filter based on the changes to the network;
    identifying one or more devices which match the updated filter;
    notifying the device proxy of which devices match the updated filter;
    the device proxy distributing a policy to the devices which match the updated filter in order to policy manage these devices.

* * * * *